July 3, 1934.     S. H. CLARK     1,965,279
GASKET
Filed Jan. 28, 1932

Inventor
Stewart Harvey Clark
By Dype & Kirchner
Attorneys

Patented July 3, 1934

1,965,279

UNITED STATES PATENT OFFICE 1,965,279

GASKET

Stewart Harvey Clark, Union City, Ind.

Application January 28, 1932, Serial No. 589,509

5 Claims. (Cl. 20—69)

My invention relates to sealing means for closure members in the form of gaskets or weatherstripping adapted to be applied to one of a pair of cooperating closure members to seal the cooperating surfaces of the members against passage of heat and cold.

The gasket is particularly adapted to be installed on a refrigerator door or door jamb, and is so shown in the accompanying drawing by way of illustration and not limitation. It is to be understood however that the structure contemplated by the invention is of wide general application and hence is adapted to be used with any kind or type of closure members, whether hinged together, slidably associated, or otherwise related.

The invention contemplates a type of gasket which includes a relatively soft, deformable and resilient packing body, adapted to be compressed between the adjacent surfaces of a pair of closure members. An important object of the invention is to provide a composite gasket structure which includes superior means for affixing the soft packing body securely to the supporting door or door jamb surface.

Another object and advantage of the invention is the provision of a gasket of the type indicated which may be economically manufactured, quickly and inexpensively applied to operative position, and which will efficiently perform its required functions.

Prior to my present invention gaskets have been manufactured including a soft packing body with independent spaced enlargements formed on one surface of the body for securing the gasket to its support by engagement of the enlargements with spaced holes formed in the support. Such prior art construction has been subject to several serious disadvantages among which may be mentioned the following:

Gaskets including spaced fastening buttons are difficult and expensive to manufacture, since the packing body proper must be first extruded or molded, and the spaced buttons subsequently secured thereto. My invention provides, in lieu of the spaced independent buttons, a continuous fastening flange, depending from the under surface of the packing body, adapted to be engaged with a continuous slot or channel in the support. The gasket structure with its continuous fastening flange is of uniform cross section throughout its entire length, so that the gasket, or the part thereof carrying the fastening flange, may be continuously molded or extruded in a single operation, thereby greatly lowering manufacturing costs.

Moreover, the continuous character of the fastening flange eliminates the necessity, inherent in gaskets including independent fastening buttons, of positioning the fastening means accurately along the length of the packing body to register with preformed holes in the supporting surface.

An additional feature of my invention in a preferred form of embodiment is the association with the soft packing body of a base strip of somewhat harder and more rigid material for supporting the packing body. The prior art types of button gaskets lack such supporting element, so that such gaskets are unsecured to the supporting door or door jamb surface in the spaces between the buttons, with the result that these unsupported and unsecured portions of the gasket may be pulled from the door or jamb surface by sticking to the cooperating closure member. The result is that after a more or less long period of use the prior art gaskets become wavy and irregular due to permanent elongation of the portions of the gasket between the buttons.

The gasket contemplated by my present invention eliminates this defect by providing continuous fastening means holding every portion of the gasket securely to the door or jamb, and by affording to all portions of the packing body the support of the strip of harder material.

Furthermore, the use of a continuous fastening flange and/or the supporting strip of harder material, permits the use of softer and more resilient material in the packing body, since regardless of the softness of the packing body material such body is effectively and adequately supported throughout its entire length.

An additional advantage of the structure contemplated by this invention is the facility with which it may be secured to a closure member at the corners thereof. It will be understood that the channels of the members may be run completely into the corners of the member, and that the cooperating fastening flange of the gasket may be engaged with the channel in the extreme corner. In the application of the button type of gasket to the closure member it has been customary to locate buttons on the gasket and cooperating holes in the closure member at a slight distance on each side of the corner of the member, so that the gasket material in the extreme corner was unsecured thereto and poorly supported thereby.

The invention is shown in certain preferred forms of embodiment on the accompanying drawing which forms part of this application for Letters Patent and in which like reference characters designate the same part in the several views.

In the drawing

Figure 1:
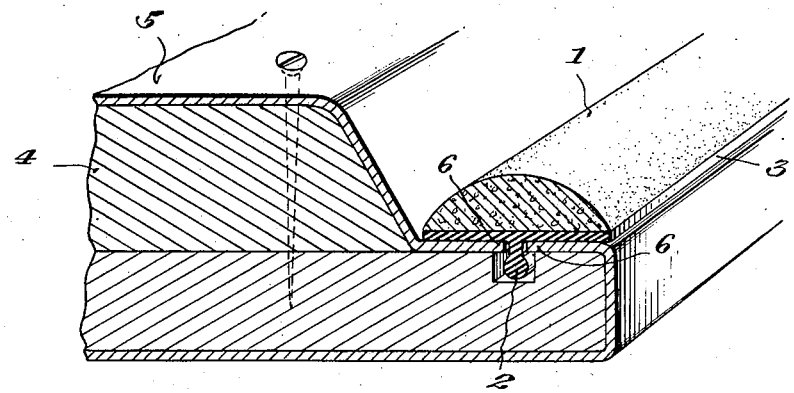
Figure 1 is a perspective view, with one end in cross section, of a portion of a door or door jamb provided with a gasket as contemplated by the present invention.
Figure 2:
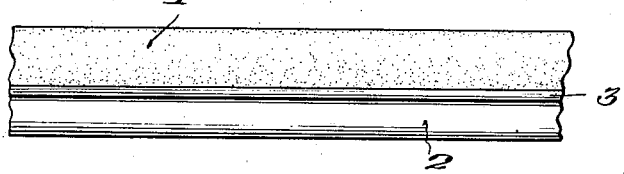
Fig. 2 is a side elevational view of the gasket detached from the closure member.

Referring now to the drawing, the reference character 1 designates a packing body of relatively soft, deformable and resilient material. I have shown in the drawing, and prefer to employ, the relatively coarse, open cellular rubber material known as sponge rubber in forming the packing body, but it will be understood that other soft, deformable and resilient substances may be substituted therefor. I prefer to form the packing body in a half round or semi-cylindrical shape, but it will be evident that the specific shape of this element is not of the essence of the invention, and may be varied.

Depending from the under surface of the packing body which is conveniently made plane or flat, is a continuous fastening tongue or flange 2, preferably, but not necessarily extended at a right angle from the longitudinal center line of the packing body and provided with a slight edge enlargement or bead. While this flange 2 may be made integral with, and of the same material as, the packing body 1, I prefer to form the flange as a portion of a separate strip of material 3 which is somewhat harder and more rigid than the substance of which the packing body 1 is formed, and which underlies and is securely bonded to the bottom surface of the packing body. I have shown the strip 3 with its flange 2 made of rubber, of denser character than the sponge rubber of the packing body, but it will be understood that any material other than rubber may be employed, as long as it exhibits the required physical characteristics of a fair degree of firmness and flexibility, as will be understood.

When the supporting strip 3 is employed, it is firmly bonded to the packing body 1 by cement, vulcanization or otherwise.

The reference numeral 4 designates generally the interior structure of a door or door jamb, which is overlaid and enclosed by a metallic shell 5.

Figure 3:
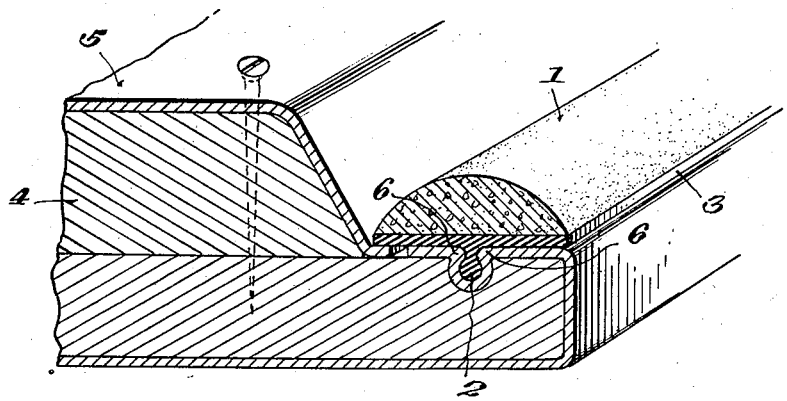
Fig. 3 is a view similar to that of Fig. 1, showing a modified disposition of the closure member to receive the fastening flange of the gasket.

The channel provided in the closure member for the reception of the gasket fastening flange 2 is formed in any convenient manner. In Fig. 1 the channel is formed as a groove cut in the interior structure 4 of the door, conveniently of wood or the like, and the channel lips are formed by spaced meeting edges 6, 6, of the metal sheets which form the shell 5. In Fig. 3 the interior structure of the closure member is recessed and a portion of one of the metal sheets which form the shell 5 is indented into the recess. It will be obvious that other and further types of channel may be provided in the closure member, and that it is desirable but not necessary that the lips of the channel be slightly more constricted than the body thereof so as to effect a more secure engagement of the beaded edge of the fastening flange 2 when forced into the channel.

The channel preferably extends rectangularly completely around the margins of the door jamb, and the fastening flange 2 of the gasket is preferably contained in the channel throughout its entirety, including those portions of the channel located in the four corners of the closure member. In the application of the gasket to the corner of the member, a small segment of the material of the gasket is cut out from the interior of the bend according to well understood practice.

The gasket is preferably manufactured in continuous lengths, any subdivision of which may be applied to any portion of the closure member provided with a suitable channel. The several elements of the gasket may be made of any suitable materials in any convenient manner. When, as is preferred, the gasket is made of rubber, it may be molded in relatively short lengths which are subsequently spliced together, or the gasket may be extruded through a die to form initially a structure of continuous length.

It will be understood that I have shown and described in the foregoing application my invention in certain preferred forms of embodiment merely by way of exemplification and not limitation. The invention may be practiced in other and further modified forms, and all such modifications, to the extent that they embody the principles of the invention as pointed out in the appended claims, are to be deemed within the scope and purview thereof.

I claim:

1. A gasket including a packing body of relatively soft resilient material and a strip of harder and more rigid material having a relatively wide, flat surface securely bonded to a surface of the packing body, said strip being provided with a continuous fastening flange depending substantially normally from its opposite surface and extending uninterruptedly substantially along the longitudinal center line of the strip.

2. A gasket including a substantially semi-cylindrical packing body of relatively soft, resilient rubber, and a supporting strip of harder and more rigid rubber firmly bonded to the flat under surface of the packing body, in combination with a continuous and unbroken flange or tongue extending substantially right angularly from substantially the longitudinal center line of the bottom surface of the strip adapted to be received in a channel formed in a support for securing the gasket thereto.

3. A gasket as claimed in claim 2, in which the depending flange is provided with an enlargement along its free edge.

4. A gasket adapted to be compressed between a pair of closure members including a packing body of relatively soft resilient material having a flat under side and a strip of harder and more rigid material secured to the under side of the packing body having a generally flat under side for seating against one of the closure members provided with a continuous fastening flange extending at substantially a right angle from said side for engaging a channel formed in said member.

5. A gasket adapted to be compressed between a pair of closure members including a packing body of relatively soft resilient material having a flat under side and a strip of harder and more rigid material secured to the under side of the packing body having a generally flat under side for seating against one of the closure members provided with a continuous fastening tongue or flange extending at substantially a right angle from said side having a bead or enlargement along its free edge adapted to be retained in a channel formed in said member.

STEWART HARVEY CLARK.